United States Patent
Salamat et al.

(10) Patent No.: US 7,500,724 B2
(45) Date of Patent: Mar. 10, 2009

(54) SYSTEM AND METHOD FOR ADAPTIVE BRAKE APPLICATION AND INITIAL SKID DETECTION

(75) Inventors: Bijan Salamat, Santa Clarita, CA (US); Robert D. Cook, Valencia, CA (US)

(73) Assignee: Hydro-Aire, Inc., Burbank, CA (US)

( * ) Notice: Subject to any disclaimer, the term of this patent is extended or adjusted under 35 U.S.C. 154(b) by 0 days.

(21) Appl. No.: 11/157,384

(22) Filed: Jun. 20, 2005

(65) Prior Publication Data

US 2005/0225171 A1 Oct. 13, 2005

Related U.S. Application Data

(60) Continuation of application No. 10/803,210, filed on Mar. 17, 2004, now Pat. No. 6,916,075, which is a continuation of application No. 10/225,092, filed on Aug. 21, 2002, now Pat. No. 6,722,745, which is a continuation-in-part of application No. 10/027,820, filed on Dec. 21, 2001, now Pat. No. 6,527,350, which is a continuation of application No. 09/887,581, filed on Jun. 21, 2001, now Pat. No. 6,345,872, which is a division of application No. 09/591,093, filed on Jun. 8, 2000, now Pat. No. 6,299,262, which is a continuation of application No. 08/850,680, filed on May 2, 1997, now Pat. No. 6,132,016.

(51) Int. Cl.
*B60T 8/00* (2006.01)
(52) U.S. Cl. .................................. 303/112; 303/178
(58) Field of Classification Search ............... 303/112, 303/156, 155, 178, 126, 135, 187, 188, 189, 303/160

See application file for complete search history.

(56) References Cited

U.S. PATENT DOCUMENTS 3,574,417 A 4/1971 Howard et al.

(Continued)

FOREIGN PATENT DOCUMENTS

DE 20 40 074 8/1971

(Continued)

OTHER PUBLICATIONS

Motohiro Igarashi. et al. Digital Brake Control System for Mag-lev Trains, presented at STech '93 (International Conference on Speedup Technology for Railway and MAGLEV Vehicles), Nov. 1993, Yokohama, Japan.

*Primary Examiner*—Melanie Torres
(74) *Attorney, Agent, or Firm*—Fulwider Patton LLP

(57) ABSTRACT

The adaptive brake application and initial skid detection system allows rapid brake application and prevents deep initial skids. Brake torque is compared with a predetermined threshold brake torque. Wheel velocity error signals are also generated to indicated the difference between the wheel velocity and a reference velocity signal. A torque bias modulator integrator responsive to brake torque signals adjusts the wheel velocity error signals to provide an anti-skid control signal. The torque bias modulator integrator can also be initialized to the value of the measured brake torque when the wheel velocity error signals indicate the beginning of a skid. Brake torque difference signals are generated to indicate the difference between brake torque and a commanded brake torque, and an adjusted brake torque error signal is generated in response to the brake torque difference signals.

1 Claim, 2 Drawing Sheets

U.S. PATENT DOCUMENTS

| | | | |
|---|---|---|---|
| 3,578,819 A | 5/1971 | Atkins | |
| 3,587,798 A | 6/1971 | Schuman | |
| 3,604,760 A | 9/1971 | Atkins | |
| 3,614,174 A | 10/1971 | Romero | |
| 3,682,512 A | 8/1972 | Malon et al. | |
| 3,702,714 A | 11/1972 | Branson | |
| 3,711,163 A | 1/1973 | Booher | |
| 3,724,916 A | 4/1973 | Hirzel | |
| 3,829,167 A | 8/1974 | Rouf et al. | |
| 3,955,652 A | 5/1976 | Nilsson et al. | |
| 4,033,630 A | 7/1977 | Hubbard | |
| 4,043,607 A | 8/1977 | Signorelli et al. | |
| 4,105,258 A | 8/1978 | Bornfleth | |
| 4,313,616 A | 2/1982 | Howard | |
| 4,336,592 A | 6/1982 | Beck | |
| 4,338,668 A * | 7/1982 | Cook | 701/71 |
| 4,412,291 A | 10/1983 | Amberg et al. | |
| 4,543,633 A | 9/1985 | Cook | |
| 4,768,840 A | 9/1988 | Sullivan | |
| RE33,486 E | 12/1990 | Hirzel et al. | |
| 5,312,168 A | 5/1994 | Breen | |
| 5,333,943 A | 8/1994 | Kashiwabara et al. | |
| 5,390,990 A * | 2/1995 | Cook et al. | 303/132 |
| 5,390,992 A | 2/1995 | Walenty et al. | |
| 5,507,568 A * | 4/1996 | Cook et al. | 303/135 |
| 5,605,387 A * | 2/1997 | Cook et al. | 303/132 |
| 5,700,072 A * | 12/1997 | Cook et al. | 303/135 |
| 5,895,100 A | 4/1999 | Ito et al. | |
| 6,015,194 A | 1/2000 | Decker | |
| 6,036,285 A | 3/2000 | Murphy | |
| 6,132,016 A | 10/2000 | Salamat et al. | |
| 6,217,131 B1 | 4/2001 | Schanzenbach | |
| 6,220,676 B1 | 4/2001 | Rudd, III | |
| 6,299,262 B1 | 10/2001 | Salamat et al. | |
| 6,345,872 B2 * | 2/2002 | Salamat et al. | 303/178 |
| 6,435,625 B1 | 8/2002 | Schwarz et al. | |
| 6,496,768 B2 | 12/2002 | Yamamoto | |
| 6,527,350 B2 | 3/2003 | Salamat et al. | |
| 6,655,755 B2 * | 12/2003 | Salamat et al. | 303/155 |
| 6,722,745 B2 * | 4/2004 | Salamat et al. | 303/126 |
| 6,916,075 B2 * | 7/2005 | Salamat et al. | 303/112 |
| 2003/0120413 A1 | 6/2003 | Park et al. | |

FOREIGN PATENT DOCUMENTS

| | | |
|---|---|---|
| DE | 42 43 245 | 6/1994 |
| EP | 231829 | 8/1987 |
| EP | 378810 | 7/1990 |
| EP | 386939 | 9/1990 |
| EP | 426959 | 5/1991 |
| EP | 445575 | 9/1991 |
| EP | 575936 | 12/1993 |
| EP | 0 601 681 | 6/1994 |
| FR | 2637231 | 4/1990 |
| GB | 1 319 268 | 6/1973 |
| GB | 2292195 | 2/1996 |

* cited by examiner

SYSTEM AND METHOD FOR ADAPTIVE BRAKE APPLICATION AND INITIAL SKID DETECTION

RELATED APPLICATIONS

This is a continuation of Ser. No. 10/803,210, filed Mar. 17, 2004, now U.S. Pat. No. 6,916,075, which is a continuation of Ser. No. 10/225,092, filed Aug. 21, 2002, now U.S. Pat. No. 6,722,745, which is a continuation-in-part of Ser. No. 10/027,820, filed Dec. 21, 2001, now U.S. Pat. No. 6,527,350, which is a continuation of Ser. No. 09/887,581, filed Jun. 21, 2001, now U.S. Pat. No. 6,345,872, which is a divisional of Ser. No. 09/591,093, filed Jun. 8, 2000, now U.S. Pat. No. 6,299,262, which is a continuation of Ser. No. 08/850,680, filed May 2, 1997, now U.S. Pat. No. 6,132,016.

BACKGROUND OF THE INVENTION

1. Field of the Invention

This invention relates generally to deceleration control systems for vehicles, and more particularly concerns an adaptive brake application and initial skid detection system for braking of one or more wheels of an aircraft during landing that prevents deep initial skids, and to thus allow rapid brake application in a controlled manner.

2. Description of the Related Art

Anti-skid and automatic braking systems commonly have been provided on commercial and large turbine aircraft to aid the deceleration of the aircraft upon landing. Modern anti-skid systems typically optimize braking efficiency by adapting to runway conditions and other factors affecting braking to maximize deceleration, corresponding to the level of brake pressure selected by the pilot. In conventional antiskid systems, brakes are typically applied mechanically via a metering valve by the pilot, and as soon as the wheel brake pressure approaches the skid level, such as when an initial skid is detected, a brake pressure value is used to initialize the anti-skid control system. However, it has been found that the success of this method can be affected by such factors as the mode of aircraft operation, aircraft weight, tire/runway interfaces, and the like. It would therefore be desirable to provide an adaptive brake application system that can adjust brake pressure or torque application to account for such factors.

Furthermore, rapid pedal application by an aircraft pilot also can often create deep initial skids before an effective antiskidding brake pressure or brake torque is determined and skidding is effectively controlled by conventional antiskid and brake control systems. Eliminating or reducing initial skids would result in shorter aircraft stopping distances, which allow the aircraft to land on shorter runways, and can result in reduced tire wear. It would thus be desirable to provide an initial skid detection system to automatically anticipate initial skid conditions and adjust to prevent deep initial skids, to allow the pilot to depress the brake pedals at any rate, while still providing for rapid brake application in a controlled manner. The present invention provides an adaptive brake application and initial skid detection system that meets these needs.

SUMMARY OF THE INVENTION

Briefly, and in general terms, the present invention provides for an adaptive brake application and initial skid detection system that allows rapid brake application, while preventing deep initial skids, by implementation of a skid anticipation system that is initialized as soon as a wheel approaches a skid level to reduce brake application pressure or torque and to apply brakes in a controlled manner.

The invention accordingly provides for a "smart" brake application and initial skid detection system for braking of a wheel of an aircraft during landing. The system is applicable to one or more wheels having a wheel brake for applying brake torque to the wheel. A brake torque sensor generates brake torque signals that are a function of the braking torque applied to the wheel brake, and the brake torque signals are compared with a predetermined threshold brake torque. A wheel speed transducer produces wheel speed signals that are a function of the rotational speed of the wheel, and a wheel velocity signal is generated based upon the wheel speed signals. The wheel velocity is compared with a reference velocity signal for generating wheel velocity error signals indicative of the difference between the aircraft wheel velocity signals and the reference velocity signal. A torque bias modulator integrator is also provided that is responsive to brake torque signals for adjusting the wheel velocity error signals to provide an anti-skid control signal, and in one currently preferred embodiment the torque bias modulator integrator is initialized with the predetermined threshold brake torque plus a predetermined constant torque value. A command processor generates a command brake torque signal generated in response to a deceleration command, and brake torque comparison means are provided for comparing the brake torque signals with the command brake torque signal for generating brake torque difference signals indicative of the difference between the brake torque signals and the command brake torque signal. Control means provide an adjusted brake torque signal to the wheel brake to control the wheel brake independently of operator brake application, in response to the brake torque difference signals. In another presently preferred embodiment, the torque bias modulator integrator is initialized to the value of a measured brake torque when the wheel velocity error signal indicates the beginning of a skid.

In a currently preferred embodiment, means are also provided for adjusting the brake torque error signals by a proportional torque gain, an integral torque gain, and a differential torque gain. In another presently preferred embodiment, transient control means for providing a proportional control signal and compensation network means, both responsive to the velocity error signal, are also provided, and the outputs of the transient control means and compensation network means are summed with the output of the torque bias modulator integrator.

From the above, it can be seen that the present invention provides a system and method to initiate brake control after rapid application of the brake pedal, but before the onset of skidding occurs. These and other aspects and advantages of the invention will become apparent from the following detailed description and the accompanying drawings, which illustrate by way of example the features of the invention.

DETAILED DESCRIPTION OF THE PREFERRED EMBODIMENTS

Effectiveness of conventional antiskid systems can be affected by the mode of aircraft operation, aircraft weight, tire/runway interfaces, and similar factors. Rapid aircraft brake pedal application, especially panic application, can also create deep initial skids before antiskid control is initiated, resulting in lengthening of aircraft stopping distances and increased tire wear.

Figure 1:
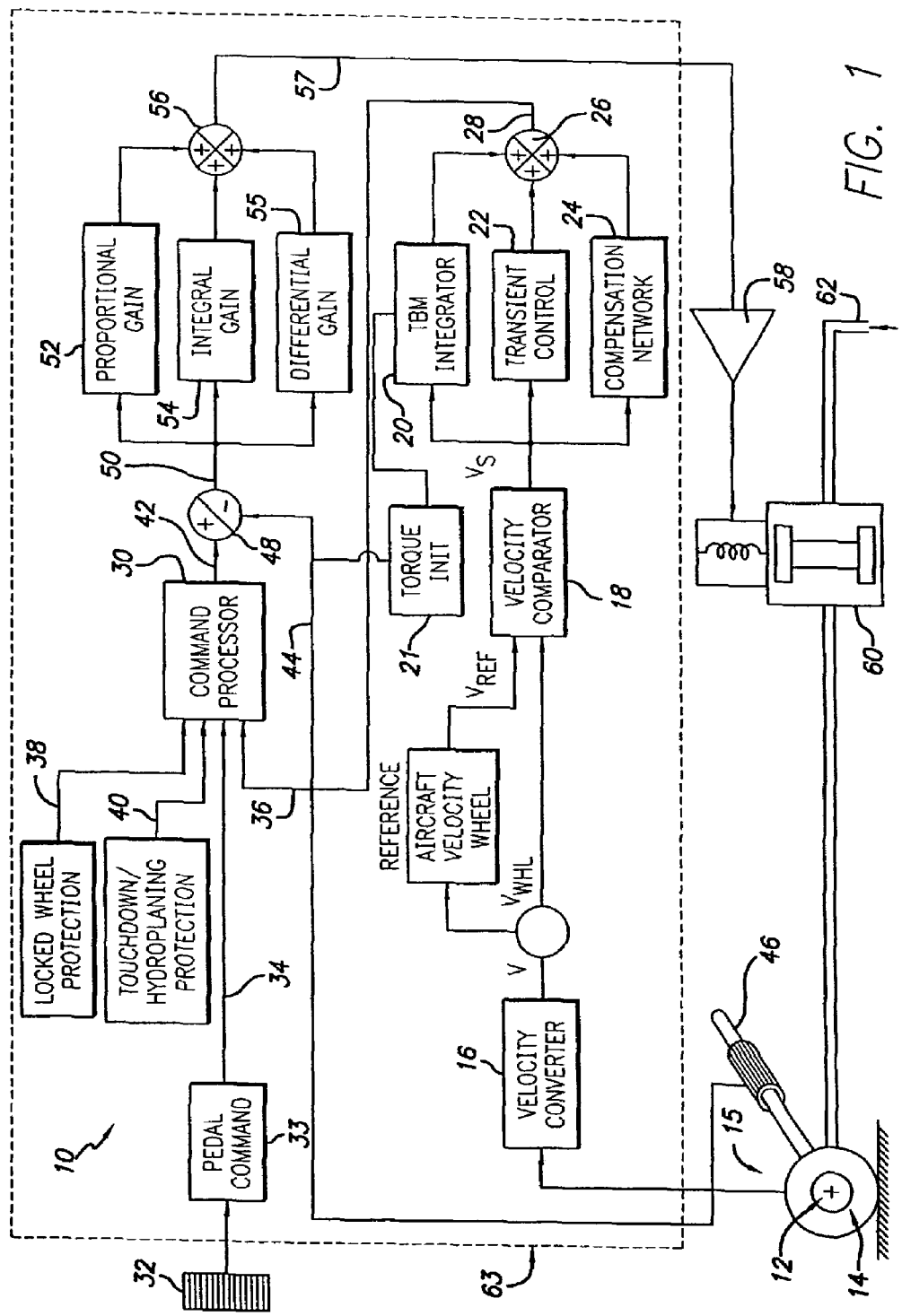
FIG. 1 is a schematic diagram of a "smart" brake application and initial skid detection system for an aircraft, according to the principles of the invention.

The present invention provides a system and method for direction of the conditions for the onset of skidding, and the initiation of brake control to prevent deep skids prior to controlled deceleration. With reference to FIG. 1, the invention is embodied in an adaptive, or "smart" brake application and initial skid detection system 10 which can be used in aircraft braking systems, and as installed for an aircraft preferably includes a wheel speed transducer 12 for each wheel brake 14 of a wheel 15 of the aircraft, for measuring wheel speed and generating wheel speed signals that are a function of the rotational speed of the brake wheel. The wheel speed signal is typically converted to a signal representing the velocity of the aircraft by a velocity converter 16, and compared with a desired reference velocity in velocity comparator 18, to generate wheel velocity error signals indicative of the difference between the wheel velocity signals from each braked wheel and the reference velocity signal. The output of the velocity comparator is referred to as slip velocity (Vs) or velocity error. The velocity error signals are adjusted by a torque bias modulator control means (TBM) integrator 20, the transient control means 22, and compensation network 24, the outputs of which are summed at summing junction 26 to provide an anti-skid control signal 28 received by the command processor 30, typically a microprocessor. The TBM integrator in the antiskid loop dictates the maximum allowable control torque level during braking. The TBM integrator is typically slower in response than other control parameters needed to detect and control initial skid. When no skid is detected, this integrator allows full system torque to the brakes.

The position of the aircraft brake pedal 32 operated by the pilot is typically read by a microcontroller 33 that generates a brake pedal command signal 34, from which a torque application profile is determined. The command processor 30 receives the brake pedal command signal, the anti-skid control signal 28 via feedback line 36, and preferably also receives a locked wheel protection signal 38 indicating whether a wheel is locked, and a touchdown/hydroplaning protection signal 40, to guard against hydroplaning of a wheel on touchdown at high speeds. In a currently preferred embodiment, the command processor operates on the lowest input of the locked wheel protection signal, the touchdown protection signal, the pedal signal, and the antiskid signal. The commanded brake torque signal output 42 of the command processor is compared with the brake torque feedback signal 44 from brake torque sensor 46 by comparator 48, which generates an output torque error signal 50.

In a currently preferred embodiment, the brake torque error signals are also adjusted by a proportional gain by proportional gain circuitry 52, an integral gain by integral gain circuitry 54, and a differential gain by differential gain circuitry 55 that together form a PID control loop, and the outputs of which are summed at summing junction 56 to provide an adjusted brake torque signal 57. The adjusted brake torque signal is also typically amplified by valve amplifier 58 to provide an amplified brake control signal applied to the brake control valve 60 that controls the application of pressurized brake fluid from system torque 62 to the wheel brake.

In a presently preferred embodiment, the functions of the elements in the block 63 are performed by one or more microprocessors under appropriate software control, although alternatively these or analogous functions may be performed by suitable hardware components. It will be appreciated by those skilled in the art that the component parameters and configurations will vary from aircraft to aircraft and that there is thus wide variability in how the system can be used.

Figure 2:
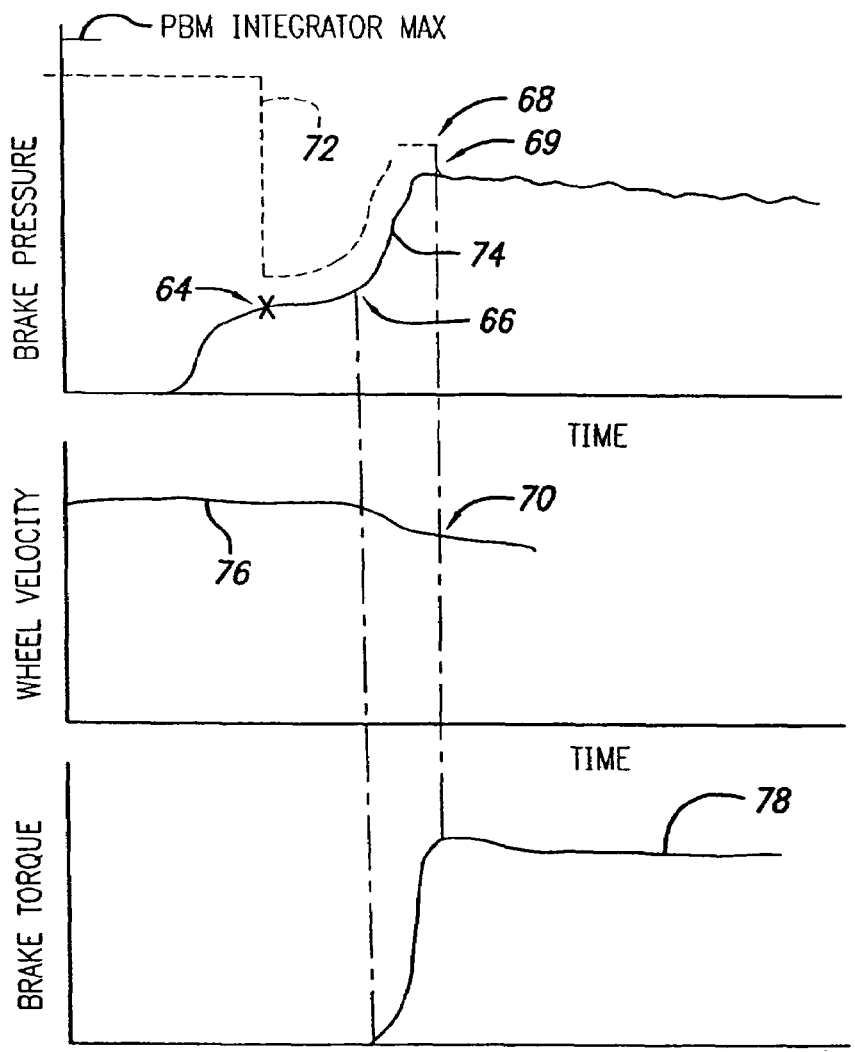
FIG. 2 shows two charts relating brake pressure, wheel velocity and brake torque over time for the "smart" brake application and initial skid detection system of the invention.
Figure 3:
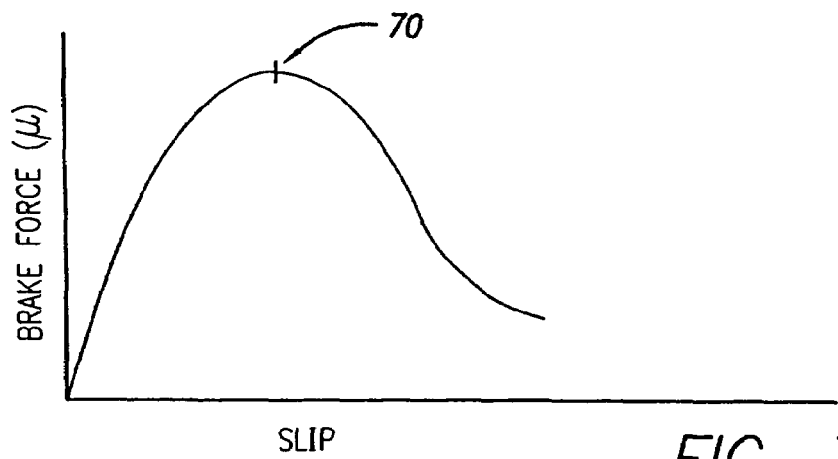
FIG. 3 is a chart illustrating the brake force to brake slip curve for the "smart" brake application and initial skid detection system of the invention.

"Smart" Brake Application:

Referring to FIG. 2, brake application is allowed without any rate limiting until brake torque is detected at a preset value 64, typically near the brake contact torque 66, at which point the brake torque commences to rise. Then the TBM integrator is initialized by a means for intitalizing the torque bias modulator integrator, such as the TORQUE INIT unit 21 shown in FIG. 1, to the preset brake torque value plus a predetermined constant increment of torque, at 68, which corresponds to the peak of the brake torque-slip curve 70 shown in FIGS. 2 and 3. The output of the TBM integrator is shown as dotted line 72, and the commanded brake torque output is shown as line 74. The wheel velocity is shown as line 76, and brake torque is shown as line 78. As is illustrated in FIG. 2, the initialization of the TBM integrator forces the TBM integrator to track the brake application profile beginning at 69, thus preventing any substantial overshoot.

"Smart" Skid Detection:

When a wheel approaches the skid level, such as when Vs is detected to be greater than the preset wheel velocity limit, then the TBM integrator is initialized with the value of brake torque feedback at the time that Vs is greater than the preset limit. This method ensures correct initialization of the TBM integrator. The brake torque at the time of an initial skid is what the TBM integrator needs to be for the immediate control without multiple initial skids. Therefore a fast response of the TBM integrator is insured to an otherwise slow moving control function.

It should be apparent that this invention is not limited to velocity error type systems, and that the invention is also applicable to other brake control skid detection concepts, such as rate control/detection, as well as any system that monitors the brake application and pressure or torque.

From the above, it will be recognized by those skilled in the art that the present invention provides a new and novel method and apparatus to indicate brake control prior to the initialization of skids and to prevent overshoot and instability after brake control is begun.

It will also be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In an adaptive brake application and initial skid detection system for braking of a wheel of a vehicle, the vehicle having a braking system including a wheel brake for braking the wheel, means for generating a wheel velocity signal indicative of wheel velocity, velocity reference generating means for generating a reference velocity signal, and wheel velocity comparison means for comparing said wheel velocity signal with said reference velocity signal for generating wheel velocity error signals indicative of the difference between said wheel velocity signal and said reference velocity signal for controlling braking the wheel, the improvement comprising:
- a brake torque sensor for generating brake torque signals that are a function of the brake torque applied to the wheel;
- means for comparing said brake torque signals with a predetermined threshold brake torque;
- a torque bias modulator integrator responsive to said wheel velocity signals for adjusting said wheel velocity error signals to provide an anti-skid control signal;
- command brake torque signal generating means for generating a command brake torque signal in response to a deceleration command;
- brake torque comparison means for comparing said brake torque signals with said command brake torque signal for generating brake torque difference signals indicative of the difference between said brake torque signals and said command brake torque signal;
- control means for providing an adjusted brake torque signal to said wheel brake to control said wheel brake independently of operator brake application, in response to said brake torque difference signals; and
- means for initializing the torque bias modulator integrator with a predetermined threshold brake torque plus a predetermined constant torque value.

\* \* \* \* \*